June 26, 1962  H. OSTERLOH ET AL  3,041,077
PIPE JOINTS
Filed Nov. 19, 1958
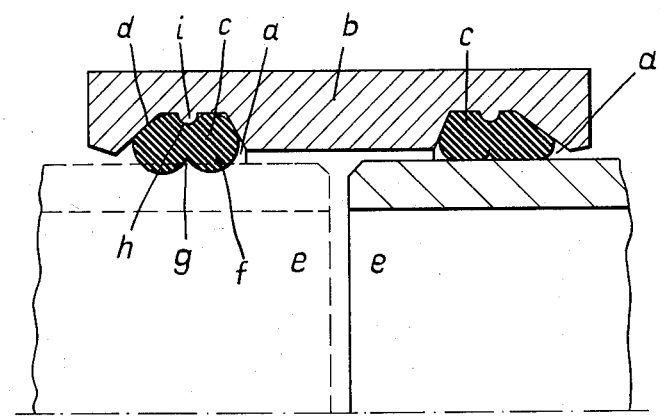
Inventors:
HANS OSTERLOH, WERNER VOSSEN,
WALTER ZUMBROICH
by
Mestern & Hollin
ATTORNEYS

United States Patent Office 3,041,077
Patented June 26, 1962

3,041,077
PIPE JOINTS
Hans Osterloh, Duisburg-Ungelsheim, Werner Vossen, Dusseldorf, and Walter Zumbroich, Hosel, Kreis Mettmann, Germany, assignors to Mannesmann Aktiengesellschaft, Dusseldorf, Germany
Filed Nov. 19, 1958, Ser. No. 774,927
3 Claims. (Cl. 277—171)

This invention relates to improvements in pipe joints and more particularly to those employed for continuous cylindrical pipes and comprising sleeves (double sockets) and packing rings.

In pipe line construction, particularly when assembling pipes of larger diameters, it is necessary to connect pipes of certain definite lengths. Generally, this is done by means of firm and/or loose flanges and sockets; and various embodiments of these are known. There are also known so-called double-socket sleeves which are employed with continuous cylindrical pipes or tubes. The sealing of such joints was effected for a long time by applying packing rings made of rubber or similar materials. A great variety of forms has been also suggested for these packing rings with regard to their sealing effect and assembly. There have already been proposed packing rings having a circular cross-section, sealing lips and saw-tooth-like outer faces which were of generally conical shape. A displacement of these types of packing rings into their sealing position was effected by internal pressure of the pipeline. These devices being also intended to facilitate the assembly. Therefore, many of these packing rings are positioned in recesses of the sleeve, being of lesser or larger dimensional extent. They indeed exhibit generally a satisfactory result against high and higher internal pressures. However, there is present the risk, when using these, that in the event of external pressure occurring, e.g. when the pipe line is running empty due to lack of internal pressure upon the packing ring, the ground water or the like is penetrating into and polluting the interior of the pipe line. The sealing effect, however, even under lower pressures, e.g. when filling up the pipe system—at least in the beginning—is in many cases insufficient. Another drawback of the known types of pipe joints is due to the fact that in a minority of cases, above all with packings being displaceable or slideable within the socket sleeve, there is hardly any assurance that the ring is really positioning or is positioned so as to afford the best possible sealing effect. Finally, in using the known joints the disassembly of single pipes or tubes in the event of necessary repair or dismantling a line, considerable difficulties are encountered, since the packing ring in its final position due to the internal pressure i.e. under maximum contact pressure stops and does not allow the extraction of the inserted pipe. The packing ring itself is thereby twisted, so that it becomes nearly always unserviceable. Generally, however, the sockets or sleeves must be destroyed, whereby the pipes too are ruined. Packing rings employing saw tooth-like grooves are easily damaged by relatively thin-walled projections, whereby their sealing capacity is considerably lowered.

The object of the present invention is to provide pipe joints having packing rings which no longer exhibit the above-mentioned drawbacks, i.e. to provide means which do not allow any displacement or misalignment of the packing ring due to external pressure, due to lower internal pressure, or due to an angular arrangement of the pipes; to provide means affording the best possible sealing effect and yet allowing easy assembly and disassembly, thus preventing any injury or damage to the packing ring and pipes or socket sleeves; to provide means warranting safe support and positive locking of the packing ring for preventing any leakage of the pipe line.

The appended drawing illustrates an embodiment of the present invention.

The recess $a$, arranged in a double-socket sleeve $b$, receives the packing ring $c$ in its inner portion. The part of the ring being turned toward the socket end is formed with a flattening $d$ inclined to the interior and joining with a corresponding face of the recess $a$. The portion $f$ of the packing ring $c$ being turned toward the end of the inserted pipe $e$ is of a nearly completely rounded off form and is defined by the grooves $g$, $h$, against the anterior portion of the packing ring which is turned toward the socket-end. A circular projection $i$ provided in the recess $a$ of the double-socket sleeve $b$ locks the groove $h$ and thereby prevents a displacement or misalignment of the sealing ring $c$ within the recess $a$. The inner diameter of the sealing ring $c$ is smaller than the outer diameter of the inserted pipe $e$, so as to effect that the insertion of the pipe—as seen from the right half of the drawing—results in a vigorous compression of the ring $c$, causing the space of the recess $a$ to be completely filled out.

The packing rings $c$ are inserted into the socket or double-socket sleeve recess $a$ in a manner known per se and have an internal diameter smaller than the outer diameter of the pipe $e$ to be pushed in. The sleeve recess $a$ receiving the packing ring $c$ is dimensioned so as to allow any deformation of the ring, but by no means its displacement or misalignment. The packing ring $c$ in accordance with the invention has a form of cross section resembling very much to that of two cohering rings, whereby, however, the portion turned toward the socket end is flattened at the outer circumference toward the interior. Adjoining this ring, there is a nearly completely circular designed portion $f$ being defined by a deep groove provided in each case in the outer, or in the inner periphery, viz. grooves $g$, $h$.

The recess $a$ in which the sealing ring is placed with a certain initial tension has practically no clearance available, particularly no clearance which would permit a displacement or misalignment of the ring. Moreover, a circular projection $i$ has been provided in the recess $a$ locking the outer groove in the packing ring $c$ and additionally impeding any motion of the ring. Although the application of lubricants for facilitating the pipe insertion had hitherto by no means been required, the inner groove $g$ is intended among others to receive lubricating means and to preserve it in order to facilitate a disassemblage which perhaps may become necessary after years.

Accordingly, the sealing effect of the packing ring in accordance with the invention is substantially effected by the mass displacement being due to the insertion of the counterpipe, the outer diameter of which must be larger than the inner diameter of the ring. The massive and sturdy construction of the ring allows a compression of same to an extent being sufficient for the sealing effect and it has been proved that positive locking, i.e. safe sealing effect is attained in spite of the dangerous angular arrangement of the pipes' ends, even in the case of high pressures. The practical shape of the cross section being well rounded-off toward all sides offers—even in the event of clumsy insertion of the pipe—no possibility of crushing and injuring the packing ring. Of course, the pipe joint in accordance with the invention may be assembled and disassembled without applying thereby any auxiliary tools.

Owing to the groove $h$, provided in the outer periphery of the packing ring $c$, coacting with the projection $i$ in the recess $a$ the high internal pressure will always effect merely a closer contact to the socket and pipe walls, but by no means any displacement or misalignment of the packing ring, whereas the chamfer provided at the portion turned toward the socket end will by all means guarantee safe support of the ring c within the sleeve socket b. Together with the inclined surface d of the recess a the inclined cross-sectional form of the ring affords a large sealing surface, which proved to be sufficient, even in the case of the sharpest possible angular arrangement of the pipe ends.

High outer pressure is counteracted by the inner roundness of the portion of the ring being turned toward the pipe end, viz. portion f, and in this case also, the circular projection i resting in the recess a prevents any displacement or misalignment of the packing ring together with the groove h at the outer periphery of the ring c, and the pressing on of the ring body against the walls of the recess can merely increase this sealing effect. Comprehensive observations while assembling and disassembling this type of pipe joint have shown that the socket or sleeve in accordance with the invention, together with the action of the packing ring in accordance with the invention do possess in every respect considerable advantages in contrast to the known pipe joint types.

What we claim is this:

1. In a pipe connector, in combination, a sleeve member having a portion adapted to surround a pipe, said portion being formed with an annular internal recess confronting the periphery of said pipe and having flanks diverging in the direction thereof, a sealing ring received in said recess and provided with an annular outer groove, and an annular rib on said sleeve member within said recess extending inwardly toward said pipe between said flanks into said groove, said ring being formed with an annular inner groove opening toward said periphery of said pipe for retaining a lubricant applied between said pipe and said sealing ring and being of generally rounded cross-section.

2. The combination according to claim 1 wherein said sealing ring is generally of figure-eight cross-section.

3. The combination according to claim 1 wherein said sleeve member is adapted to be thrust axially over said pipe in a predetermined direction, said flanks including a first recess wall inclined toward said pipe forwardly in said direction and including therewith a relatively small acute angle, and a second recess wall inclined toward said pipe in the opposite direction while including therewith a relatively large acute angle.

References Cited in the file of this patent

UNITED STATES PATENTS

| | | |
|---|---|---|
| 508,765 | Rouse | Nov. 14, 1893 |
| 787,391 | Niederlander | Apr. 18, 1905 |
| 2,028,182 | Barnickol | Jan. 21, 1936 |
| 2,389,825 | Smith | Nov. 27, 1945 |
| 2,599,767 | Long | June 10, 1952 |
| 2,738,992 | Heisler | Mar. 20, 1956 |
| 2,953,398 | Haugen | Sept. 20, 1960 |

FOREIGN PATENTS

| | | |
|---|---|---|
| 856,283 | Germany | Sept. 25, 1952 |
| 557,464 | Italy | Feb. 15, 1957 |